United States Patent [19]

Mc'Carty et al.

[11] 4,339,874

[45] Jul. 20, 1982

[54] METHOD OF MAKING A WEDGE-SHAPED PERMANENT MAGNET ROTOR ASSEMBLY

[75] Inventors: Frederick B. Mc'Carty, San Pedro; Alexander Silver, Tarzana, both of Calif.

[73] Assignee: The Garrett Corporation, Los Angeles, Calif.

[21] Appl. No.: 214,357

[22] Filed: Mar. 10, 1980

Related U.S. Application Data

[62] Division of Ser. No. 973,346, Dec. 26, 1978, Pat. No. 4,242,610.

[51] Int. Cl.³ .............................................. H02K 15/02
[52] U.S. Cl. ........................................ 29/598; 310/42; 310/156; 310/261
[58] Field of Search .................. 29/598, 596; 310/156, 310/153, 261, 262, 42, 43, 218

[56] References Cited

U.S. PATENT DOCUMENTS

| | | | |
|---|---|---|---|
| 1,948,854 | 2/1934 | Heath | 310/156 |
| 1,979,813 | 11/1934 | Reis | 310/156 |
| 2,493,102 | 1/1950 | Bruinard | 310/156 |
| 2,719,931 | 10/1955 | Kobev | 310/156 |
| 2,930,916 | 3/1960 | Scanlon et al. | 310/156 |
| 3,072,813 | 1/1963 | Reijnst et al. | 310/156 |
| 3,083,311 | 3/1963 | Krasnow | 310/156 |
| 3,671,788 | 6/1972 | Knudson et al. | 310/156 |
| 3,677,330 | 7/1972 | Maximovich et al. | 164/DIG. 10 |
| 3,858,308 | 1/1975 | Peterson | 29/598 |
| 3,909,647 | 9/1975 | Peterson | 310/156 |
| 4,117,360 | 9/1978 | Richter | 310/156 |

FOREIGN PATENT DOCUMENTS

2659650 11/1978 Fed. Rep. of Germany .

Primary Examiner—Carl E. Hall
Attorney, Agent, or Firm—Fay I. Konzem; Albert J. Miller

[57] ABSTRACT

A rotor assembly having self-locking wedge-shaped permanent magnets.

6 Claims, 3 Drawing Figures

METHOD OF MAKING A WEDGE-SHAPED PERMANENT MAGNET ROTOR ASSEMBLY

This is a division of application Ser. No. 973,346 filed Dec. 26, 1978, now U.S. Pat. No. 4,242,610.

CROSS-REFERENCE TO RELATED APPLICATIONS

This invention relates to subject matter disclosed in U.S. patent applications Ser. No. 973,345, filed Dec. 26, 1978, by Jerry Glaser, entitled "Rotor Assembly Having Anchors with Undulating Sides"; Ser. No. 973,344, filed Dec. 26, 1978, by Alexander Silver, entitled "Rotor Assembly Having Rectangularly Shaped Tongues", now U.S. Pat. No. 4,260,921, and Ser. No. 973,343, filed Dec. 26, 1978, by Alexander Silver, Frederick B. McCarty and Lyman R. Burgmeier, entitled "Rotor Assembly with Magnet Cushions", now U.S. Pat. No. 4,302,693, each of which are assigned to the same assignee as this application.

BACKGROUND OF THE INVENTION

This invention relates to permanent magnet rotors and, more particularly, to wedge-shaped permanent magnets in a rotor assembly for use in magnetic couplings, motors, and generators.

A permanent magnet generator generally consists of a rotor including an even number of equally spaced, alternating polarity magnets around the radial periphery and a stator which includes a number of windings arranged to obtain magnetic couplings with the rotor poles. Rotation of the rotor causes the flux linkage of the permanent magnets with respect to the stator coils to vary, thus inducing an electromotive force in each of the stator coils.

In the prior art, the rotor permanent magnets have been rectangularly shaped and supported against centrifugal load by a hoop shrunk over the rotor's periphery. The magnets have relatively poor tensile stress but fairly good compressive strength so they should be compressively retained. In the case of high speed rotors, the thickness of the magnet retaining hoop was greatly increased, disproportionate to other parts of the rotor, because self-stress of the hoop was large and little structural capacity remained available to carry the magnets. Also, difficulties arose in uniformly distributing the magnet load into the hoop, and this introduced bending stress concentrations into the hoop. Also, as the hoop thickness was increased, reluctance of the magnetic circuit increased and pole head leakage increased.

SUMMARY OF THE INVENTION

The permanent magnet rotor, in accordance with the invention, includes a rotatable hub with a plurality of inwardly converging wedge-shaped support members of magnetic material located around and affixed to the non-magnetic hub and outwardly converging wedge-shaped tangentially magnetized. permanent magnets which are radially located within the support members.

Advantages of the present invention are that the rotor can rotate at a higher tip speed and also achieve better utilization of the magnet's field than the prior art rotors. The magnets are held in place in the support member by their wedge-shape without a thick hoop intervening between the magnets and the stator. Structural retention of magnets is provided by fusion bonding to an internal hub of non-magnetic material and proportioned such that it has little or no effect on the exciting flux.

DETAILED DESCRIPTION OF THE PREFERRED EMBODIMENT

Figure 1:
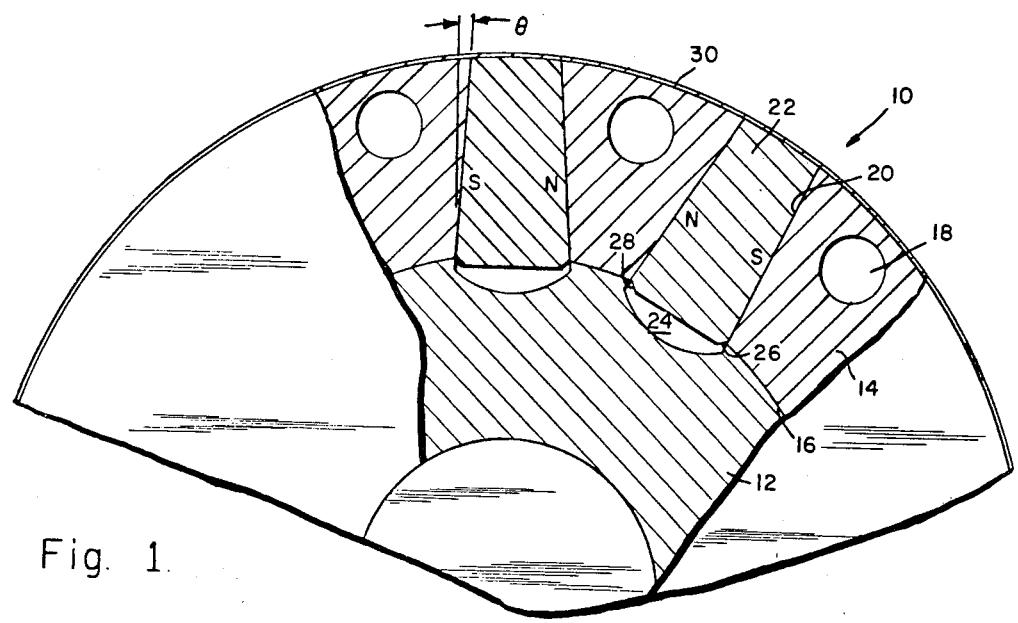
FIG. 1 is a cross-section view of the rotor assembly of the present invention with tangentially magnetized magnets.
Figure 2:
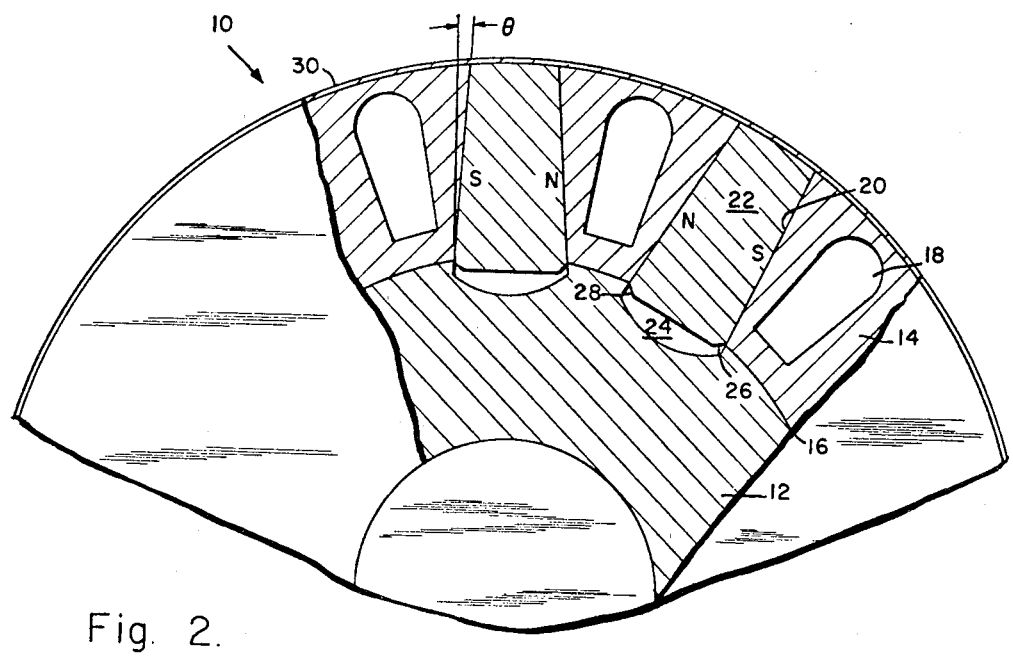
FIG. 2 shows a variance of the embodiment of FIG. 1.

Referring now to FIGS. 1 and 2, a permanent magnet rotor assembly 10 includes a cylindrically shaped hub 12 which is surrounded by and affixed to support members 14. The hub 12 consists of a non-magnetic material and the support members 14 consist of a ferromagnetic material when tangentially magnetized magnets are used. The hub 12 and the support members 14 are joined at the junction 16. A variety of conventional methods can be used to join the hub 12 and the support members 14; namely, furnace brazing the two materials together, using a cast bonding technique, diffusion bonding, or bonding by the hot isostatic pressure (HIP) process.

The support members 14 have a plurality of generally equally spaced holes 18 disposed near the periphery thereof for reducing the rotor mass so that the rotor 10 can operate at high speeds. The holes 18 can be of a variety of shapes, the circular shaped holes as shown in FIG. 1 being the easiest to fabricate, whereas, the oblong-shaped holes as shown in FIG. 2 are more difficult to fabricate into the support members 14 but result in lighter weight and a higher tip speed limit. The size and location of the holes 18 is established with regard to magnetic and structural considerations.

The centrifugal stresses in the rotating rotor 10 are a function of radial dimensions, i.e. the centrifugal forces get greater the farther out from the center of the rotor 10. Therefore, in order to reduce the stresses at critical sections (such as at the bonded joint 16) mass is removed from the pole body 14 as near to the periphery of the pole body 14 as magnetic, structural, and manufacturing considerations allow.

Besides allowing higher tip speed, the holes 18 permit cooling air flow through the pole body 14 and help to dissipate rotor surface heat caused by eddy currents. Since the stator of a generator or motor is not a smooth surface, but has iron teeth which cause ripple in the air gap flux, eddy currents exist in the rotor surface and cause heating. Excessive temperature is harmful to the structural and magnetic properties of the rotor and magnets.

The support members 14 form a plurality of outwardly converging substantially wedge-shaped slots 20 that are radially disposed about the hub 12.

The size of the angle formed between the wall of the slots 20 and a plane parallel to a central radius through the magnet is critical and should be slightly less than the angle of friction. This angle is experimentally determined and is the maximum angle at which a locking wedge action is achieved for the material and conditions pertinent to a given design. If the angle is too large the magnets will not remain locked in place after the rotor ceases to rotate and if the angle is too small, lateral crushing forces may cause the magnet to fracture. Therefore, there is a critical range within which the locking angle θ must lie. It has been found that the size of the locking angle θ should be between 2 to 9 degrees, preferably 6 to 8 degrees.

A plurality of wedge-shaped magnets 22 of substantially the same shape as the slots 20 are placed in each of the slots 20. The magnets 22 are composed of a permanent magnet material. The base of the magnet 22 can have slightly rounded corners 26 and 28 for easy insertion into the slots 20.

The magnets 22 are shorter in length than the depth of the slot 20 thereby forming a gap 24 between the base of the magnet 22 and the bottom of the slot 20. The purpose of the gap 24 is to provide a stress relieving radius at the root of the support members 14, to facilitate assembly, and to further cool the rotor 10 permitting cooling air to flow through the rotor assembly.

A thin hoop 30 which is heat shrunk upon the peripheral surface of the support members 14 functions as an electric damper to intercept and diminish the flux harmonics caused by the stator and penetrating into the support members 14 and into the magnet 22. Reflecting eddy currents are produced in the hoop 30, thereby shielding the permanent magnet 22 and the support members 14. The hoop 30 has a minor structural function, providing a retaining force over the peripheral contact with the magnets 22 and the support members 14. This retaining force is small and merely supplemental to the retaining provided by the hub 12. The hoop 30 consists of a high strength, non-magnetic material preferably having a low resistivity, such as a beryllium copper alloy.

Installing the magnets 22 into the rotor assembly consists of first sliding the magnets into the base of slot 20 followed by rotating the rotor 10 at its maximum allowable speed. During rotation the magnets 22 move radially outward due to centrifugal force. The magnets 22 lock in place in the slots 20 even after the rotor has ceased rotating due to the compressive forces exerted on the magnets 22 by the walls of the support members 14. The outer portions of the support members 14 and the magnets 22 are then ground to the proper dimensions and the hoop 30 is shrunk onto the periphery, thus completing the assembly.

Figure 3:
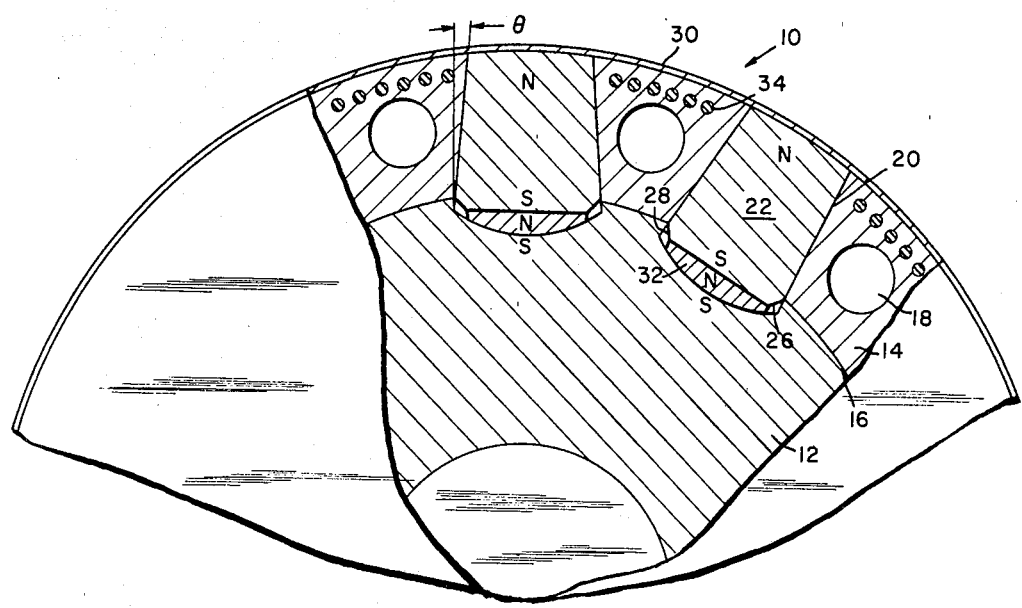
FIG. 3 is a cross-section view of the rotor assembly radially magnetized magnets and dampening bars.

FIG. 3 shows a rotor assembly with radially magnetized magnets 22. With the radially magnetized magnets 22, the hub 12 consists of a magnetic material and the support members 14 consists of a non-magnetic material. With the radially magnetized magnets 22 of FIG. 4, the gap 24 is filled with a closure shim 32. The shim 32 consists of a ferromagnetic or a permanent magnet material to substantially reduce the reluctance which an air gap created by gap 24 would create. The shim 32 is inserted into the gap 24 after the magnet 22 has been rotated and thereby locked in place as described above.

The rotor assembly 10 of FIG. 3 also has dampening bars 34 which are located near the rotor's periphery and extend through the support members 14. When used with the dampening hoop 30 the bars 34 provide added electrical dampening. Alternatively, the bar 34 can be used without the hoop 30 to intercept and diminish the flux harmonics caused by the stator.

While specific embodiments of the invention have been illustrated and described, it is to be understood that these embodiments are provided by way of example only and the invention is not to be construed as being limited thereto, but only by the proper scope of the following claims.

What is claimed is:

1. A method of forming a rotor for a permanent magnet machine, comprising the steps of:
affixing a plurality of inwardly converging, wedge-shaped support members equally spaced around the periphery of a rotor hub to form a plurality of outwardly converging, wedge-shaped slots therebetween;
inserting a plurality of wedge-shaped permanent magnets having outwardly converging sides, individual magnets disposed in individually outwardly converging wedge-shaped slots between support members; and
rotating the rotor to wedge the outwardly converging permanent magnets into the outwardly converging slots without additional restraint on said magnets.

2. A method of forming a rotor for a permanent magnet machine, comprising the steps of:
affixing a plurality of inwardly converging, wedge-shaped support members equally spaced around the periphery of a rotor hub to form a plurality of outwardly converging, wedge-shaped slots therebetween;
inserting a plurality of wedge-shaped permanent magnets having outwardly converging sides, individual magnets disposed in individually outwardly converging wedge-shaped slots between support members, the sides of said individual magnets forming an angle within the range of 2–9 degrees with a plane parallel to the rotor radius through the center line of said individual magnets; and
rotating the rotor to wedge the outwardly converging permanent magnets into the outwardly converging slots without additional restraint on said magnets.

3. A method of forming a rotor for a permanent magnet machine, comprising the steps of:
affixing a plurality of inwardly converging, wedge-shaped support members equally spaced around the periphery of a rotor hub to form a plurality of outwardly converging, wedge-shaped slots therebetween;
inserting a plurality of wedge-shaped permanent magnets having outwardly converging sides, individual magnets disposed in individually outwardly converging wedge-shaped slots between support members, the sides of said individual magnets forming an angle within the range of 6–8 degrees with a plane parallel to the rotor radius through the center line of said individual magnets; and
rotating the rotor to wedge the outwardly converging permanent magnets into the outwardly converging slots without additional restraint on said magnets.

4. A method of forming a permanent magnet rotor, comprising the steps of:
permanently affixing a plurality of inwardly converging, wedge-shaped ferromagnetic support members equally spaced around the periphery of a non-magnetic rotatable hub to form a plurality of outwardly converging wedge-shaped slots therebetween;
inserting a plurality of wedge-shaped tangentially magnetized permanent magnets having outwardly converging sides, individual magnets disposed in individual outwardly converging wedge-shaped slots between support members; and
without additional restraint on said magnets, rotating the rotor to wedge the outwardly converging permanent magnets in place in the outwardly converging slots without excessive compressive force applied to the sides of said magnets.

5. A method of forming a permanent magnet rotor comprising the steps of:

permanently affixing a plurality of inwardly converging wedge-shaped ferromagnetic support members equally spaced around the periphery of non-magnetic rotatable hub to form a plurality of outwardly converging wedge-shaped slots therebetween;

inserting a plurality of wedge-shaped tangentially magnetized permanent magnets having outwardly converging sides, individual magnets disposed in individual outwardly converging wedge-shaped slots between support members, the sides of said individual magnets forming an angle within the range of 2–9 degrees with a plane parallel to the rotor radius through the center line of said individual magnets; and without additional restraint on said magnets, rotating the rotor to wedge the outwardly converging permanent magnets in place in the outwardly converging slots without excessive compressive force applied to the sides of said magnets.

6. A method of forming a permanent magnet rotor comprising the steps of:

permanently affixing a plurality of inwardly converging wedge-shaped ferromagnetic support members equally spaced around the periphery of non-magnetic rotatable hub to form a plurality of outwardly converging wedge-shaped slots therebetween;

inserting a plurality of wedge-shaped tangentially magnetized permanent magnets having outwardly converging sides, individual magnets disposed in individual outwardly converging wedge-shaped slots between support members, the sides of said individual magnets forming an angle within the range of 6–8 degrees with a plane parallel to the rotor radius through the center line of said individual magnets; and without additional restraint on said magnets, rotating the rotor to wedge the outwardly converging permanent magnets in place in the outwardly converging slots without excessive compressive force applied to the sides of said magnets.

* * * * *